United States Patent
Feng et al.

(10) Patent No.: US 10,547,382 B2
(45) Date of Patent: Jan. 28, 2020

(54) FSO COMMUNICATION SYSTEM

(71) Applicant: CRRC ZHUZHOU ELECTRIC LOCOMOTIVE RESEARCH INSTITUTE CO., LTD., Zhuzhou, Hunan (CN)

(72) Inventors: Jianghua Feng, Hunan (CN); Jiabo Xiao, Hunan (CN); Qinghua Quan, Hunan (CN); Tairan Zhang, Hunan (CN); Guotao Jiang, Hunan (CN); Qi Lu, Hunan (CN)

(73) Assignee: CRRC ZHUZHOU ELECTRIC LOCOMOTIVE RESEARCH INSTITUTE CO., LTD., Zhuzhou, Hunan (CN)

( * ) Notice: Subject to any disclaimer, the term of this patent is extended or adjusted under 35 U.S.C. 154(b) by 0 days.

(21) Appl. No.: 16/329,226

(22) PCT Filed: May 11, 2017

(86) PCT No.: PCT/CN2017/083953
§ 371 (c)(1),
(2) Date: Feb. 28, 2019

(87) PCT Pub. No.: WO2018/094975
PCT Pub. Date: May 31, 2018

(65) Prior Publication Data
US 2019/0253143 A1    Aug. 15, 2019

(30) Foreign Application Priority Data
Nov. 28, 2016  (CN) .......................... 2016 1 1075012

(51) Int. Cl.
*H04B 10/112*   (2013.01)
*H04B 10/079*   (2013.01)
(Continued)

(52) U.S. Cl.
CPC ... *H04B 10/1129* (2013.01); *H04B 10/07955* (2013.01); *H04B 10/112* (2013.01); *H04B 10/564* (2013.01); *H04B 10/672* (2013.01)

(58) Field of Classification Search
CPC .............................................. H04B 10/11–118
(Continued)

(56) References Cited

U.S. PATENT DOCUMENTS 5,808,760 A * 9/1998 Gfeller ............... H04B 10/1143
340/13.24
6,115,157 A * 9/2000 Barnard ............. H04J 14/0221
398/1
(Continued)

FOREIGN PATENT DOCUMENTS

| CN | 1633043 A | 6/2005 |
| CN | 1835421 A | 9/2006 |

(Continued)

OTHER PUBLICATIONS

International Search Report for PCT/CN2017/083953 dated Jun. 29, 2017, ISA/CN.
(Continued)

*Primary Examiner* — Li Liu
(74) *Attorney, Agent, or Firm* — Yue (Robert) Xu; Apex Attorneys at Law, LLP

(57) ABSTRACT

An FSO communication system includes a laser, an optical detector and a first optical adjustment module and a controller. The laser is configured to emit an optical signal. The optical detector is configured to receive an optical signal from the first optical adjustment module. The controller is configured to obtain an optical power of an optical signal received by the optical detector; and generate a control command based on the optical power and transmit the control command. The first optical adjustment module is (Continued)

configured to: receive the control command and the optical signal emitted by the laser; adjust, in response to the control command, the optical signal emitted by the laser to cause the optical power of the optical signal received by the optical detector to be in a preset reasonable range; and transmit the adjusted optical signal to the optical detector.

8 Claims, 4 Drawing Sheets

(51) Int. Cl.
  *H04B 10/564* (2013.01)
  *H04B 10/67* (2013.01)
(58) Field of Classification Search
  USPC .................................................. 398/118–131
  See application file for complete search history.

(56) References Cited

U.S. PATENT DOCUMENTS

| | | | | |
|---|---|---|---|---|
| 6,122,084 A * | 9/2000 | Britz | ................. | H04B 10/0775 385/140 |
| 6,239,888 B1 * | 5/2001 | Willebrand | ........ | H04B 10/1125 398/118 |
| 6,462,847 B2 * | 10/2002 | Willebrand | ........ | H04B 10/1125 398/139 |
| 8,774,635 B2 * | 7/2014 | Juarez | ................ | H04B 10/1121 398/118 |
| 10,109,183 B1 * | 10/2018 | Franz | ..................... | G08C 23/04 |
| 2002/0012139 A1 * | 1/2002 | Willebrand | ........ | H04B 10/1125 398/115 |
| 2002/0012150 A1 * | 1/2002 | Willebrand | ........ | H04B 10/1125 398/141 |
| 2002/0167697 A1 * | 11/2002 | Willebrand | ........ | H04B 10/1125 398/118 |
| 2002/0171896 A1 * | 11/2002 | Clark | ................. | H04B 10/1121 398/121 |
| 2003/0066947 A1 * | 4/2003 | Alwan | ............... | H04B 10/0799 250/206 |
| 2004/0208593 A1 * | 10/2004 | Bloom | ................. | H04B 10/112 398/118 |
| 2007/0053696 A1 * | 3/2007 | Bloom | ................. | H04B 10/112 398/141 |
| 2012/0308239 A1 | 12/2012 | Sheth et al. | | |
| 2013/0101285 A1 | 4/2013 | Shar et al. | | |
| 2014/0072298 A1 * | 3/2014 | Hou | ................... | H04B 10/0773 398/16 |
| 2018/0234180 A1 * | 8/2018 | Takahashi | ............ | H04B 10/112 |

FOREIGN PATENT DOCUMENTS

| | | |
|---|---|---|
| CN | 101577583 A | 11/2009 |
| CN | 101729142 A | 6/2010 |
| CN | 104518827 A | 4/2015 |
| CN | 105743583 A | 7/2016 |
| CN | 106506093 A | 3/2017 |

OTHER PUBLICATIONS

CNIPA First Office Action corresponding to Application No. 201611075012.6; dated Jul. 19, 2018.

* cited by examiner

FSO COMMUNICATION SYSTEM

The present application is a national phase application of PCT international patent application PCT/CN2017/083953, filed on May 11, 2017 which claims priority to Chinese Patent Application No. 201611075012.6, titled "FSO COMMUNICATION SYSTEM", filed on Nov. 28, 2016 with the Chinese Patent Office, both of which are incorporated herein by reference in their entireties.

FIELD

The present disclosure relates to the technical field of FSO communication, and in particular to an FSO communication system.

BACKGROUND

With the development of various web applications including big data, cloud computing and Internet of Things, there is an increasing demand for a bandwidth of the network communication, especially the demand for a bandwidth of the mobile wireless communication tends to grow explosively. As a new wireless communication method, the FSO (Free Space Optic) communication combines advantages of fiber-optic communication and microwave communication and has a large communication bandwidth, no electromagnetic interference, an unrestricted spectrum and the like. The FSO communication can meet the demand for high-speed wireless communication.

FSO communication is a point-to-point communication in a visual range. In the FSO communication, an emitting end emits an optical signal to a receiving end in a small divergence angle. Only in a case that a lens of the FSO receiving end is in a light spot of the optical signal and an optical power of the received optical signal is sufficient to cause an element such as an optical detector to recover an available data signal, the signal is normally received. Since the FSO communication is generally applied in outdoor wireless communication, and the optical signal is susceptible to factors such as weather and outdoor environment during the optical signal is transmitted in the atmosphere, the optical signal may be significantly attenuated and scattered, which results in a reduced optical power of the optical signal. For example, at the same emission angle and emission power, an effective communication distance of the FSO communication may be up to a few kilometers in a sunny day, while the effective communication distance of the FSO communication may be less than one hundred meters in dense fog.

In the conventional technology, the optical power of the optical signal emitted by the FSO communication system is unchanged. As a result, it is difficult for the FSO communication system to cope with natural environment variation such as the complex weather conditions, and the FSO communication system does not have a capacity of adaptive adjustment, thus the stability of the FSO communication system cannot be ensured.

Therefore, how to provide an FSO communication system which can solve the above technical problems becomes a problem to be solved by those skilled in the art.

SUMMARY

An object of the present disclosure is to provide an FSO communication system, which can adjust an optical signal emitted by a laser during use, to cause an optical power of the optical signal received by an optical detector to be in a preset reasonable range, so as to cope with the complex and varied external environment, such that the FSO communication is more stable.

In order to solve the above technical problems, an FSO communication system is provided according to the present disclosure. The system includes an emitting end, a receiving end and a controller. The emitting end includes a laser. The receiving end includes an optical detector and a first optical adjustment module. The laser is configured to emit an optical signal. The optical detector is configured to receive an optical signal from the first optical adjustment module. The controller is configured to: acquire the optical signal received by the optical detector; obtain, based on the optical signal received by the optical detector, an optical power of the optical signal received by the optical detector; and generate a control command based on the optical power and transmit the control command. The first optical adjustment module is configured to: receive the control command and the optical signal emitted by the laser; adjust, in response to the control command, the optical signal emitted by the laser to cause the optical power of the optical signal received by the optical detector to be in a preset reasonable range; and transmit the adjusted optical signal to the optical detector.

Preferably, the controller being configured to generate a control command based on the optical power and transmit the control command includes the controller being configured to: generate a first control command and transmit the first control command in a case that the optical power is not in the preset reasonable range; and generate a second control command and transmit the second control command in a case that the optical power is in the preset reasonable range. The first optical adjustment module is configured to: in response to the first control command received by the first optical adjustment module, adjust the optical signal emitted by the laser which is received by the first optical adjustment module to cause the optical power of the optical signal received by the optical detector to be in the preset reasonable range, and transmit the adjusted optical signal to the optical detector; and in response to the second control command received by the first optical adjustment module, transmit an optical signal received by the first optical adjustment module to the optical detector.

Preferably, the first optical adjustment module includes a first optical amplifier and a first optical attenuator. The first optical amplifier is configured to: in a case that the optical power is less than a lower limit of the preset reasonable range, in response to the first control command received by the first optical amplifier, amplify the optical signal emitted by the laser which is received by the first optical amplifier to cause an optical power of the amplified optical signal to be in the preset reasonable range, and transmit the amplified optical signal to the optical detector; and in response to the second control command received by the first optical amplifier, transmit an optical signal received by the first optical amplifier to the optical detector. The first optical attenuator is configured to: in a case that the optical power is greater than an upper limit of the preset reasonable range, in response to the first control command received by the first optical attenuator, attenuate the optical signal emitted by the laser which is received by the first optical attenuator to cause an optical power of the attenuated optical signal to be in the preset reasonable range, and transmit the attenuated optical signal to the optical detector; and in response to the second control command received by the first optical attenuator, transmit an optical signal received by the first optical attenuator to the optical detector.

Preferably, the emitting end further includes a second optical adjustment module. The controller is further configured to: generate a third control command and transmit the third control command, in a case that the optical power of the optical signal received by the optical detector is not in the preset reasonable range; generate a fourth control command and transmit the fourth control command, in a case that the optical power of the optical signal received by the optical detector is in the preset reasonable range. The second optical adjustment module is configured to: in response to the third control command received by the second optical adjustment module, adjust the optical signal emitted by the laser which is received by the second optical adjustment module to cause the optical power of the optical signal received by the optical detector to be in the preset reasonable range, and transmit the adjusted optical signal to the first optical adjustment module; and in response to the fourth control command received by the second optical adjustment module, transmit an optical signal received by the second optical adjustment module to the first optical adjustment module.

Preferably, the second optical adjustment module includes a second optical amplifier and a second optical attenuator. The second optical amplifier is configured to: in a case that the optical power is less than the lower limit of the preset reasonable range, in response to the third control command received by the second optical amplifier, amplify the optical signal emitted by the laser which is received by the second optical amplifier to cause the optical power of the optical signal received by the optical detector to be in the preset reasonable range, and transmit the amplified optical signal to the first optical adjustment module; and in response to the fourth control command received by the second optical amplifier, transmit an optical signal received by the second optical amplifier to the first optical adjustment module. The second optical attenuator is configured to: in a case that the optical power is greater than the upper limit of the preset reasonable range, in response to the third control command received by the second optical attenuator, attenuate the optical signal emitted by the laser which is received by the second optical attenuator to cause the optical power of the optical signal received by the optical detector to be in the preset reasonable range, and transmit the attenuated optical signal to the first optical adjustment module; and in response to the fourth control command received by the second optical attenuator, transmit an optical signal received by the second optical attenuator to the first optical adjustment module.

Preferably, the emitting end further includes a collimator. The controller is further configured to: generate a fifth control command and transmit the fifth control command, in a case that the optical power is not in the preset reasonable range; and generate a sixth control command and transmit the sixth control command, in a case that the optical power is in the preset reasonable range. The collimator is configured to: receive the fifth control command and adjust a focus of the collimator in response to the fifth control command to adjust a divergence angle of an optical signal transmitted by the second optical adjustment module to cause the optical power to be in the preset reasonable range, and transmit the adjusted optical signal to the first optical adjustment module; and transmit, in response to the sixth control command received by the collimator, an optical signal received by the collimator to the first optical adjustment module.

Preferably, the receiving end further includes a wavefront sensor. A first input terminal of the wavefront sensor is connected to an output terminal of the first optical amplifier. A second input terminal of the wavefront sensor is connected to an output terminal of the first optical attenuator. An output terminal of the wavefront sensor is connected to an input terminal of the optical detector. The wavefront sensor is configured to reshape an optical signal received by the wavefront sensor and transmit the reshaped optical signal to the optical detector.

Preferably, the receiving end further includes an acquiring module and an adjusting module. The acquiring module is configured to acquire an environmental parameter and transmit the environmental parameter to the controller. The controller is further configured to receive the environmental parameter, generate a seventh control command based on the environmental parameter, and transmit the seventh control command. The adjusting module is configured to receive the seventh control command, and adjust a relative altitude and a relative pitch angle between the receiving end and the emitting end based on the seventh control command.

Preferably, the environmental parameter includes one or more of temperature, humidity and sunlight.

Preferably, the first optical amplifier according to any one of above embodiments is an erbium-doped fiber amplifier or a semiconductor amplifier.

Preferably, the second optical amplifier according to any one of above embodiments is an erbium-doped fiber amplifier or a semiconductor amplifier.

Preferably, the first optical attenuator is a thin-film optical attenuator.

Preferably, the second optical attenuator is a thin-film optical attenuator.

An FSO communication system is provided according to the present disclosure. The system includes an emitting end, a receiving end and a controller. The emitting end includes a laser. The receiving end includes an optical detector and a first optical adjustment module. The laser is configured to emit an optical signal. The optical detector is configured to receive an optical signal from the first optical adjustment module. The controller is configured to: acquire the optical signal received by the optical detector; obtain, based on the optical signal received by the optical detector, an optical power of the optical signal received by the optical detector; and generate a control command based on the optical power and transmit the control command. The first optical adjustment module is configured to: receive the control command and the optical signal emitted by the laser; adjust, in response to the control command, the optical signal emitted by the laser to cause the optical power of the optical signal received by the optical detector to be in a preset reasonable range; and transmit the adjusted optical signal to the optical detector.

The controller acquires the optical signal received by the optical detector, and generates the control command based on the optical power of the optical signal received by the optical detector. The first optical adjustment module adjusts the optical signal emitted by the laser according to the control command to cause the optical power of the optical signal received by the optical detector to be in the preset reasonable range, so that the available data signal is recovered normally by the optical detector and the signal is normally received. In a case that the optical power of the optical signal received by the optical detector is not in the preset reasonable range due to environmental change, the FSO communication system provided in the present disclosure can adjust the optical signal emitted by the laser, to cause the optical power of the optical signal received by the optical detector to be in the preset reasonable range, so as to cope with the complex and varied external environment, such that the FSO communication is more stable.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the provided drawings without any creative work.

DETAILED DESCRIPTION OF THE EMBODIMENTS

The present disclosure aims to provide an FSO communication system, which can adaptively adjust, as required, an optical power of the optical signal received by the optical detector during use, so as to cope with the complex and varied external environment, such that the FSO communication is more stable.

In order to make the objects, technical solutions and advantages of the present disclosure more clear, the technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

First Embodiment

Figure 1:
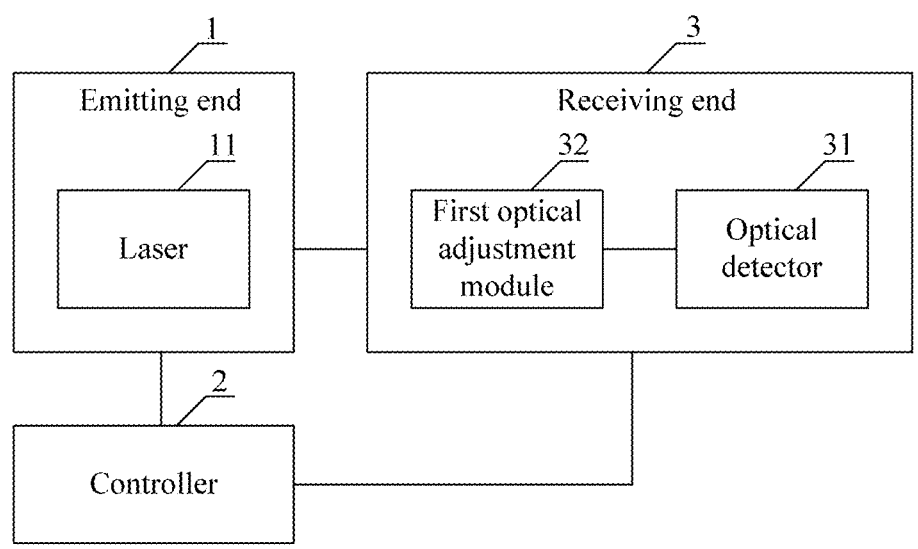
FIG. 1 is a schematic structural diagram of an FSO communication system provided in the present disclosure.

Referring to FIG. 1, which is a schematic structural diagram of an FSO communication system provided in the present disclosure. The system includes an emitting end 1, a receiving end 3 and a controller 2. The emitting end 1 includes a laser 11. The receiving end 3 includes an optical detector 31 and a first optical adjustment module 32.

The laser 11 is configured to emit an optical signal.

The optical detector 31 is configured to receive an optical signal from the first optical adjustment module 32.

The controller 2 is configured to: acquire the optical signal received by the optical detector 31; obtain, based on the optical signal received by the optical detector, an optical power of the optical signal received by the optical detector 31; and generate a control command based on the optical power and transmit the control command.

The first optical adjustment module 32 is configured to: receive the control command and the optical signal emitted by the laser 11; adjust, in response to the control command, the optical signal emitted by the laser 11 to cause the optical power of the optical signal received by the optical detector 31 to be in a preset reasonable range; and transmit the adjusted optical signal to the optical detector 31.

It should be noted that a magnitude of the optical power of the optical signal received by the optical detector 31 of the receiving end 3 is vital to recover the available data signal. In a case that the optical power is too large, the optical detector 31 cannot distinguish 1/0 signal. In a case that the optical power is too small, the optical detector 31 cannot detect the available data signal. Therefore, only in a case that the optical power of the optical signal received by the optical detector 31 is in the preset reasonable range, the optical detector 31 can normally recover the available data signal, such that the signal is normally received. In practice, the optical power of the optical signal received by the optical detector 31 may be not in the preset reasonable range due to various facts. For example, the optical power may vary with the change of the distance between the emitting end 1 and the receiving end 3, and may be affected by weather (such as haze, rain and snow), atmosphere turbulence or the like. In a case that the optical power of the optical signal received by the optical detector 31 is not in the preset reasonable range due to change of the environment, the FSO communication system in the present disclosure can adjust the optical signal emitted by the laser 11 to cause the optical power of the optical signal received by the optical detector 31 to be in the preset reasonable range, so that the FSO communication system can operate normally under the changeful environment.

Specifically, the laser 11 of the emitting end 1 emits the optical signal. The optical signal passes through the first optical adjustment module 32 and then is transmitted to the optical detector 31. Since only in a case that the optical power of the optical signal received by the optical detector 31 is in the preset reasonable range, the optical detector 31 can normally recover the available data signal, such that the signal is normally received. The controller 2 is provided according to the present disclosure, the controller acquires the optical signal received by the optical detector 31, obtains the optical power of the optical signal based on the optical signal, generates a control command based on the optical power, and transmits the control command to the first optical adjustment module 32. The first optical adjustment module 32 adjusts the optical signal received by the first optical adjustment module (that is, the optical signal emitted by the laser 11) according to the control command, to cause the optical power of the optical signal received by the optical detector 31 to be in the preset reasonable range.

In practice, the optical power of the optical signal received by the optical detector 31 may be adjusted for one or more times to cause the optical power of the optical signal received by the optical detector 31 to be in the preset reasonable range. For example, after the controller 2 acquires the optical signal received by the optical detector 31, the controller 2 controls, based on the optical power of the optical signal, the first optical adjustment module to adjust the optical signal received by the first optical adjustment module and transmit the adjusted optical signal to the optical detector 31. Then the controller 2 acquires the optical signal received by the optical detector 31 again and controls the first optical adjustment module 32 to adjust the optical signal received by the first optical adjustment module, until the optical power of the optical signal received by the optical detector 31 is in the preset reasonable range.

It should be noted that the preset reasonable range of the optical power in the present disclosure may be determined based on actual situations, and is not limited herein, as long as the object of the present disclosure is achieved.

An FSO communication system is provided according to the present disclosure. The system includes an emitting end, a receiving end and a controller. The emitting end includes a laser. The receiving end includes an optical detector and a first optical adjustment module. The laser is configured to emit an optical signal. The optical detector is configured to receive an optical signal from the first optical adjustment module. The controller is configured to: acquire the optical signal received by the optical detector; obtain, based on the optical signal received by the optical detector, an optical power of the optical signal received by the optical detector; and generate a control command based on the optical power and transmit the control command. The first optical adjustment module is configured to: receive the control command and the optical signal emitted by the laser; adjust, in response to the control command, the optical signal emitted by the laser to cause the optical power of the optical signal received by the optical detector to be in a preset reasonable range; and transmit the adjusted optical signal to the optical detector.

The controller acquires the optical signal received by the optical detector, and generates the control command based on the optical power of the optical signal received by the optical detector. The first optical adjustment module adjusts the optical signal emitted by the laser according to the control command to cause the optical power of the optical signal received by the optical detector to be in the preset reasonable range, so that the available data signal is recovered normally by the optical detector and the signal is normally received. In a case that the optical power of the optical signal received by the optical detector is not in the preset reasonable range due to environmental change, the FSO communication system provided in the present disclosure can adjust the optical signal emitted by the laser, to cause the optical power of the optical signal received by the optical detector to be in the preset reasonable range, so as to cope with the complex and varied external environment, such that the FSO communication is more stable.

Second Embodiment

Figure 2:
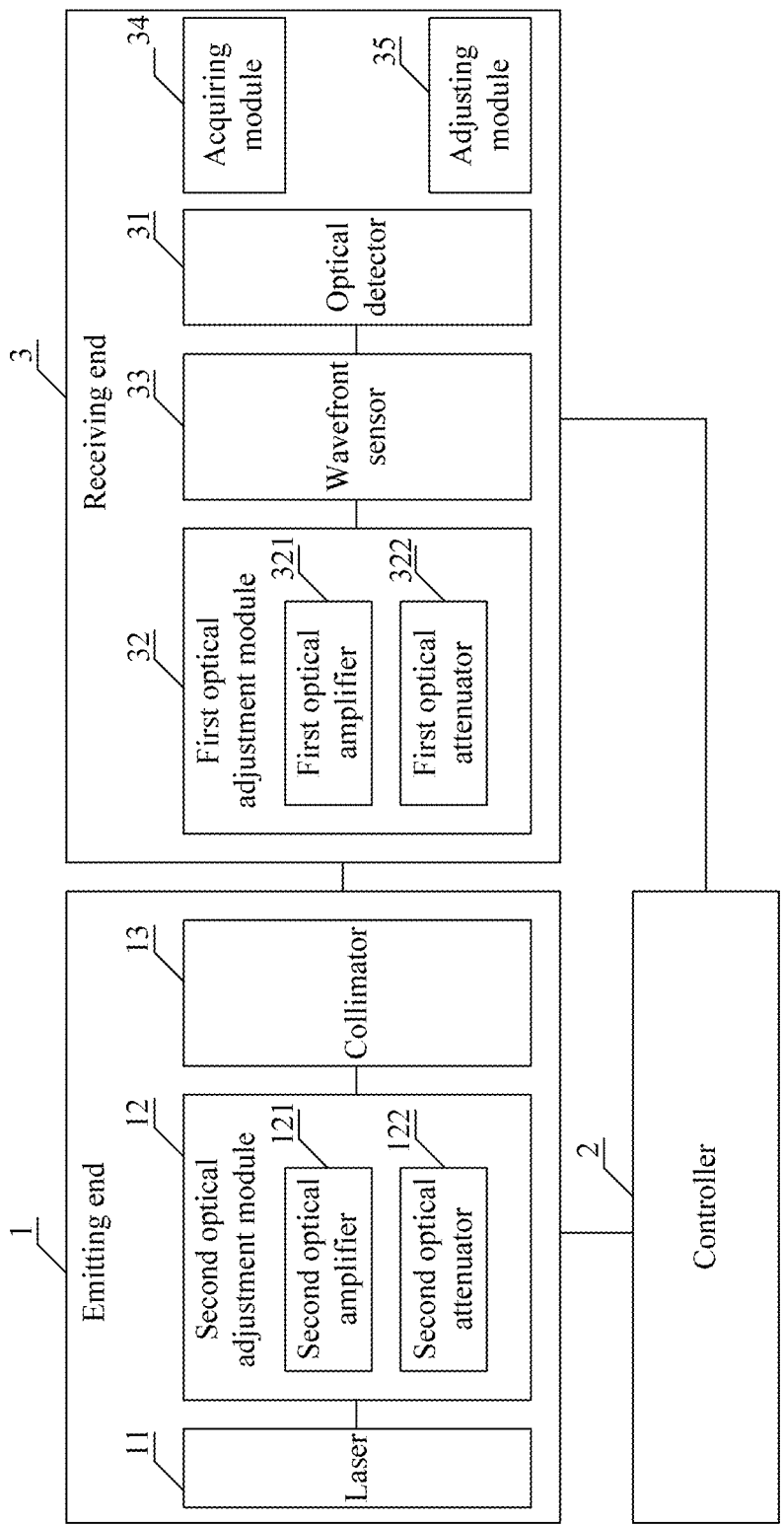
FIG. 2 is a schematic structural diagram of another FSO communication system provided in the present disclosure.

Referring to FIG. 2, which is a schematic structural diagram of another FSO communication system provided in the present disclosure.

Based on the first embodiment, preferably, the controller being configured to generate a control command based on the optical power and transmit the control command includes the controller being configured to: generate a first control command and transmit the first control command in a case that the optical power is not in the preset reasonable range; and generate a second control command and transmit the second control command in a case that the optical power is in the preset reasonable range. The first optical adjustment module 32 is configured to: in response to the first control command received by the first optical adjustment module, adjust the optical signal emitted by the laser 11 which is received by the first optical adjustment module to cause the optical power of the optical signal received by the optical detector 31 to be in the preset reasonable range, and transmit the adjusted optical signal to the optical detector 31; and in response to the second control command received by the first optical adjustment module, transmit an optical signal received by the first optical adjustment module to the optical detector 31.

It should be noted that there are two cases obtained by the controller 2 for the optical power of the optical signal received by the optical detector 31. A first case is that the optical power is not in the preset reasonable range, and a second case is that the optical power is in the preset reasonable range.

In the first case, the first optical adjustment module 32 needs to adjust the optical signal received by the first optical adjustment module 32. The controller 2 generates a first control command based on the optical power and transmits the first control command to the first optical adjustment module 32. After receiving the first control command, the first optical adjustment module 32 adjusts the optical signal received by the first optical adjustment module in response to the first control command to cause the optical power of the optical signal received by the optical detector 31 to be in the preset reasonable range.

Specifically, in a case that the optical power is too large, the first control command is an attenuation command. The first optical adjustment module 32 attenuates the optical signal received by the first optical adjustment module in response to the first control command, to reduce the optical power of the optical signal received by the optical detector 31 to be in the preset reasonable range. In a case that the optical power is too small, the first control command is an amplification command. The first optical adjustment module 32 amplifies the optical signal received by the first optical adjustment module in response to the first control command, to increase the optical power of the optical signal received by the optical detector 31 to be in the preset reasonable range.

In the second case, that is, in a case that the optical power is in the preset reasonable range, the first optical adjustment module 32 does not need to adjust the optical signal received by the first optical adjustment module 32. The controller 2 generates a second control command based on the optical power and transmits the second control command to the first optical adjustment module 32. After receiving the second control command, the first optical adjustment module 32 transmits the optical signal received by the first optical adjustment module to the optical detector 31 in response to the second control command.

As can be seen, in a case that the optical power of the optical signal received by the optical detector 31 of the receiving end 3 is not in the preset reasonable range due to changes of weather or changes of the distance between the emitting end 1 and the receiving end 3, the first optical adjustment module 32 may adjust the optical signal received by the first optical adjustment module 32 to cause the optical power of the optical signal received by the optical detector 31 to be in the preset reasonable range.

Preferably, the first optical adjustment module 32 includes a first optical amplifier 321 and a first optical attenuator 322. The first optical amplifier 321 is configured to: in a case that the optical power is less than a lower limit of the preset reasonable range, in response to the first control command received by the first optical amplifier, amplify the optical signal emitted by the laser 11 which is received by the first optical amplifier to cause an optical power of the amplified optical signal to be in the preset reasonable range, and transmit the amplified optical signal to the optical detector 31; and in response to the second control command received by the first optical amplifier, transmit an optical signal received by the first optical amplifier to the optical detector 31.

Specifically, in a case that the optical power of the optical signal received by the optical detector 31 is too small, that is, the optical power is less than the lower limit of the preset reasonable range, the first optical amplifier 321 receives the first control command (that is, the amplification command), and amplifies the optical signal received by the first optical amplifier in response to the first control command, then transmits the amplified optical signal to the optical detector 31, to cause the optical power of the optical signal received by the optical detector 31 to be in the preset reasonable range. For example, in a case that the optical power is 100 and the preset reasonable range of the optical power ranges from 500 to 1000, the first optical amplifier 321 amplifies the optical signal received by the first optical amplifier in response to the first control command received by the first optical amplifier, to cause the optical power of the optical signal to be amplified for 6 times, such that the optical power of the optical signal received by the optical detector 31 is in the preset reasonable range.

The first optical attenuator 322 is configured to: in a case that the optical power is greater than an upper limit of the preset reasonable range, in response to the first control command received by the first optical attenuator, attenuate the optical signal emitted by the laser 11 which is received by the first optical attenuator to cause an optical power of the attenuated optical signal to be in the preset reasonable range, and transmit the attenuated optical signal to the optical detector 31; and in response to the second control command received by the first optical attenuator, transmit an optical signal received by the first optical attenuator to the optical detector 31.

Specifically, in a case that the optical power of the optical signal received by the optical detector 31 is too large, that is, the optical power is larger than the upper limit of the preset reasonable range, the first optical attenuator 322 receives the first control command (that is, the attenuation command), and attenuates the optical signal received by the first optical attenuator in response to the first control command, then transmits the attenuated optical signal to the optical detector 31, to cause the optical power of the optical signal received by the optical detector 31 to be in the preset reasonable range. For example, in a case that the optical power is 2000 and the preset reasonable range of the optical power ranges from 500 to 1000, the first optical attenuator 322 attenuates the optical signal received by the first optical attenuator in response to the first control command received by the first optical attenuator, to cause the optical power of the optical signal to be attenuated for 3 times, such that the optical power of the optical signal received by the optical detector 31 is in the preset reasonable range.

It should be understood that, in a case that the optical power of the optical signal received by the optical detector 31 is in the preset reasonable range, the optical signal emitted by the laser 11 may be transmitted via the first optical amplifier 321 or the first optical attenuator 322 to the optical detector 31. In a case that the second control command is received by the first optical amplifier 321, an amplification ratio of the first optical amplifier 321 is adjusted to be 1 in response to the second control command, such that the optical signal received by the first optical amplifier is directly transmitted to the optical detector 31. In a case that the second control command is received by the first optical attenuator 322, an attenuation ratio of the first optical attenuator 322 is adjusted to be 1 in response to the second control command, such that the optical signal received by the first optical attenuator is directly transmitted to the optical detector 31.

The optical power of the optical signal received by the optical detector 31 may be not in the preset reasonable range due to various facts. In a case that the weather or the distance between the emitting end 1 and the receiving end 3 changes, the first optical adjustment module 32 of the receiving end 3 can adjust the optical power of the optical signal received by the first optical adjustment module to cause the optical power of the optical signal received by the optical detector 31 to be in the preset reasonable range, thereby ensuring a better communication between the emitting end and the receiving end 3.

Specifically, for example, the optical power of the optical signal received by the optical detector 31 changes with changes of the distance between the emitting end 1 and the receiving end 3. In a case that the distance between the emitting end 1 and the receiving end 3 is longer, the optical power of the optical signal received by the optical detector 31 of the receiving end 3 is lower (that is, the optical power is less that the lower limit of the preset reasonable range). In this case, the controller controls the first optical amplifier 321 to amplify the optical signal received by the first optical amplifier 321. In a case that the distance between the emitting end 1 and the receiving end 3 is reduced (that is, the emitting end 1 and the receiving end 3 approach each other), the optical power of the optical signal received by the optical detector 31 is increased. When the optical signal received by the first optical amplifier 321 is adjusted, the controller controls the first optical amplifier 321 to reduce the amplification ratio of the first optical amplifier 321, such that the optical power of the optical signal received by the optical detector 31 is in the preset reasonable range. In a case that the emitting end 1 and the receiving end 3 continue to approach each other, the optical power of the optical signal received by the optical detector 31 continue to be increased. In a case that the optical power of the optical signal received by the optical detector 31 is still greater than the upper limit of the preset reasonable range when the amplification ratio of the first optical amplifier 321 is reduced to be 1, in this case, the first optical adjustment module 32 is switched to the first optical attenuator 322, such that the first optical attenuator 322 attenuates the optical signal received by the first optical attenuator to cause the optical power of the optical signal received by the optical detector 31 to be in the preset reasonable range. On the contrary, in a case that the emitting end 1 and the receiving end 3 move away from each other, that is, the optical power of the optical signal received by the optical detector 31 gradually reduces from a value greater than the upper limit of the preset reasonable range to a value less that the lower limit of the preset reasonable range, the first optical adjustment module 32 switches from the first optical attenuator 322 to the first optical amplifier 321 to adjust the optical signal received by the first optical adjustment module.

Preferably, the emitting end 1 further includes a second optical adjustment module 12. The controller 2 is further configured to: generate a third control command and transmit the third control command, in a case that the optical power of the optical signal received by the optical detector 31 is not in the preset reasonable range; generate a fourth control command and transmit the fourth control command, in a case that the optical power of the optical signal received by the optical detector is in the preset reasonable range. The second optical adjustment module 12 is configured to: in response to the third control command received by the second optical adjustment module, adjust the optical signal emitted by the laser 11 which is received by the second optical adjustment module to cause the optical power of the optical signal received by the optical detector 31 to be in the preset reasonable range, and transmit the adjusted optical signal to the first optical adjustment module 32; and in response to the fourth control command received by the second optical adjustment module, transmit an optical signal received by the second optical adjustment module to the first optical adjustment module 32.

It should be noted that the optical signal emitted by the laser 11 may be adjusted by not only the first optical adjustment module 32 of the receiving end 3 but also the second optical adjustment module 12 of the emitting end 1, to cause the optical power of the optical signal received by the optical detector 31 to be in the preset reasonable range.

Specifically, in a case that the optical power of the optical signal received by the optical detector 31 is not in the preset reasonable range, the controller 2 generates a third control command based on the optical power and transmits the third control command to the second optical adjustment module 12. In a case that the optical power is too small (that is, the optical power is less than the lower limit of the preset reasonable range), the third control command is an amplification command. The second optical adjustment module 12 amplifies the optical signal emitted by the laser 11 which is received by the second optical adjustment module 12 in response to the third control command, to cause the optical power of the optical signal received by the optical detector 31 to be in the preset reasonable range. In a case that the optical power is too large (that is, the optical power is greater than the upper limit of the preset reasonable range), the third control command is an attenuation command. The second optical adjustment module 12 attenuates the optical signal emitted by the laser 11 which is received by the second optical adjustment module 12 in response to the third control command, to cause the optical power of the optical signal received by the optical detector 31 to be in the preset reasonable range.

In a case that the optical power of the optical signal received by the optical detector 31 is in the preset reasonable range, the controller 2 generates a fourth control command based on the optical power. The second optical adjustment module 12 receives the fourth control command and transmits the optical signal received by the second optical adjustment module to the first optical adjustment module 32 in response to the fourth control command.

As can be seen, in a case that the optical power of the optical signal received by the optical detector 31 of the receiving end 3 is not in the preset reasonable range due to changes of weather or changes of the distance between the emitting end 1 and the receiving end 3, the second optical adjustment module 12 can adjust the optical signal emitted by the laser which is received by the second optical adjustment module to cause the optical power of the optical signal received by the optical detector 31 to be in the preset reasonable range.

Preferably, the second optical adjustment module 12 includes a second optical amplifier 121 and a second optical attenuator 122.

The second optical amplifier 121 is configured to: in a case that the optical power is less than the lower limit of the preset reasonable range, in response to the third control command received by the second optical amplifier, amplify the optical signal emitted by the laser 11 which is received by the second optical amplifier to cause the optical power of the optical signal received by the optical detector 31 to be in the preset reasonable range, and transmit the amplified optical signal to the first optical adjustment module 32; and in response to the fourth control command received by the second optical amplifier, transmit an optical signal received by the second optical amplifier to the first optical adjustment module 32.

The second optical attenuator 122 is configured to: in a case that the optical power is greater than the upper limit of the preset reasonable range, in response to the third control command received by the second optical attenuator, attenuate the optical signal emitted by the laser 11 which is received by the second optical attenuator to cause the optical power of the optical signal received by the optical detector 31 to be in the preset reasonable range, and transmit the attenuated optical signal to the first optical adjustment module 32; and in response to the fourth control command received by the second optical attenuator, transmit an optical signal received by the second optical attenuator to the first optical adjustment module 32.

It should be noted that the second optical amplifier 121 and the second optical attenuator 122 provided in the present disclosure have the same principles as the first optical amplifier 321 and the first optical attenuator 322 respectively. Detailed descriptions of the second optical amplifier 121 and the second optical attenuator 122 can be referred to that of the first optical amplifier 321 and the first optical attenuator 322 and are not described in detail herein.

Preferably, the emitting end 1 further includes a collimator 13. The controller 2 is further configured to: generate a fifth control command and transmit the fifth control command, in a case that the optical power is not in the preset reasonable range; and generate a sixth control command and transmit the sixth control command, in a case that the optical power is in the preset reasonable range. The collimator 13 is configured to: receive the fifth control command and adjust a focus of the collimator in response to the fifth control command to adjust a divergence angle of an optical signal transmitted by the second optical adjustment module 12 to cause the optical power to be in the preset reasonable range, and transmit the adjusted optical signal to the first optical adjustment module 32; and transmit, in response to the sixth control command received by the collimator, an optical signal received by the collimator to the first optical adjustment module 32.

It should be noted that, since a magnitude of the divergence angle of the optical signal emitted by the laser affects the optical power of the optical signal received by the optical detector 31, the collimator 13 is arranged in the emitting end 1 according to the present disclosure. The collimator 13 receives the sixth control command transmitted by the controller 2, and adjust a position of the focus of the collimator in response to the sixth control command (to cause the light to travel along a straight line as far as possible), so as to adjust the magnitude of the divergence angle of the optical signal, so that the optical power of the optical signal received by the optical detector 31 is in the preset reasonable range. In practice, the magnitude of the divergence angle may be changed based on the actual condition.

In fact, the divergence angle of the optical signal may be adjusted by not only the collimator 13, but also other devices, which is not limited herein, as long as the object of the present disclosure is achieved.

Preferably, the receiving end 3 further includes a wavefront sensor 33. A first input terminal of the wavefront sensor 33 is connected to an output terminal of the first optical amplifier 321, a second input terminal of the wavefront sensor 33 is connected to an output terminal of the first optical attenuator 322, and an output terminal of the wavefront sensor 33 is connected to an input terminal of the optical detector 31. The wavefront sensor 33 is configured to reshape an optical signal received by the wavefront sensor and transmit the reshaped optical signal to the optical detector 31.

It should be noted that the wavefront sensor 33 may reshape the optical signal received by the wavefront sensor, for example, cases of scintillating light, random deflecting light beam and front wave freak may be processed, thereby reducing interference of the atmosphere turbulence on the optical signal when the optical signal travels in free space.

The wavefront sensor 33 may be replaced with other devices, which is not limited in the present disclosure, as long as the object of the present disclosure is achieved.

Preferably, the receiving end 3 further includes an acquiring module 34 and an adjusting module 35. The acquiring module 34 is configured to acquire an environmental parameter and transmit the environmental parameter to the controller 2. The controller 2 is further configured to receive the environmental parameter, generate a seventh control command based on the environmental parameter, and transmit the seventh control command. The adjusting module 35 is configured to receive the seventh control command, and adjust a relative altitude and a relative pitch angle between the receiving end 3 and the emitting end 1 based on the seventh control command.

Figure 3:
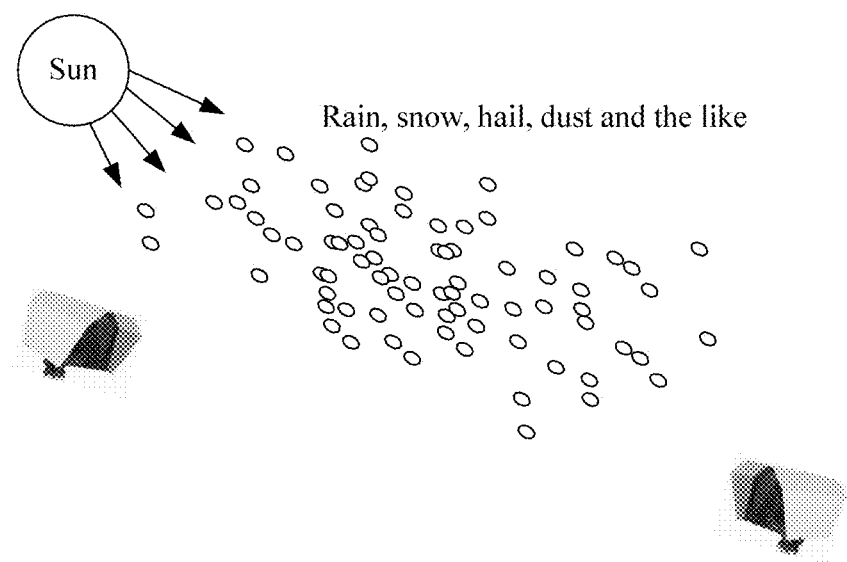
FIG. 3 is a schematic diagram showing a relative altitude and a relative pitch angle between the emitting end and the receiving end before the relative altitude and the relative pitch angle are adjusted.
Figure 4:
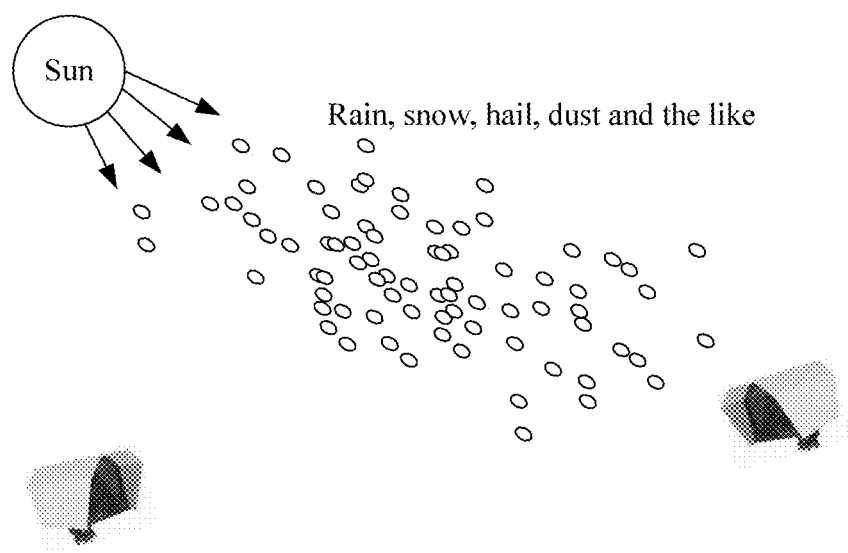
FIG. 4 is a schematic diagram showing a relative altitude and a relative pitch angle between the emitting end and the receiving end before the relative altitude and the relative pitch angle are adjusted.

Reference is made to FIGS. 3 and 4. FIG. 3 is a schematic diagram showing a relative altitude and a relative pitch angle between the emitting end and the receiving end before the relative altitude and the relative pitch angle are adjusted. FIG. 4 is a schematic diagram showing a relative altitude and a relative pitch angle between the emitting end and the receiving end before the relative altitude and the relative pitch angle are adjusted.

It should be noted that, direct beam from the sun or washout by the rain and snow on lens of the emitting end 1 and the receiving end 3 may affect the optical power of the optical signal received by the optical detector 31 of the receiving end 3. Therefore, the acquiring module 34 provided in the present disclosure acquires the environmental parameter and transmits the environmental parameter to the controller 2. The adjusting module 35 adjusts the relative altitude and the relative pitch angle between the receiving end 3 and the emitting end 1 in response to the seventh control command transmitted by the controller 2, so that the lens of the emitting end 1 and the receiving end 3 can avoid the sunlight or the rain and snow, thereby reducing the effect on the optical power of the optical signal received by the optical detector 31.

Preferably, the environmental parameter includes one or more of temperature, humidity and sunlight.

In fact, the environmental parameter is not limited to the above and may include other types of parameter, which are not limited in the present disclosure, as long as the object of the present disclosure is achieved.

Preferably, the first optical amplifier 321 described in any one of the above embodiments is an erbium-doped fiber amplifier or a semiconductor amplifier.

Preferably, the second optical amplifier 121 described in any one of the above embodiments is an erbium-doped fiber amplifier or a semiconductor amplifier.

Preferably, the first optical attenuator 322 is a thin-film optical attenuator.

Preferably, the second optical attenuator 122 is a thin-film optical attenuator.

Each of the first optical attenuator 322 and the second optical attenuator 122 may be not only the thin-film optical attenuator but also other types of attenuator, for example Neutral density filter optical attenuator, which is not limited in the present disclosure, as long as the object of the present disclosure is achieved.

It should be noted that the controller 2 provided in the present disclosure may control one or more of the first optical adjustment module 31, the second optical adjustment module 12, the collimator 13 and the wavefront sensor 33, so as to adjust the optical signal emitted by the laser.

The FSO communication system provided in the present disclosure can monitor facts such as surrounding environment and the distance between the emitting end and the receiving end in a real time manner under all weather conditions. Once a change is found, the FSO communication system can dynamically and automatically adjust the optical power, the divergence angle of the optical signal emitted by the laser, the optical signal subjected to the interference, the relative pitch angle between the emitting end and the receiving end. In this way, the FSO communication system has a capacity of adaptive adjustment under all weather conditions, thereby ensuring effectiveness of FSO communication.

Finally, it should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the element defined by the statement "comprising (including) one . . . " does not exclude the case that other similar elements may exist in the process, method, article or device including the element.

The description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure may not be limited to the embodiments described herein, but is in accordance with the widest scope consistent with the principles and novel features disclosed herein.

The invention claimed is:

1. A Free Space Optic (FSO) communication system, comprising:
   an emitting end comprising a laser configured to emit an optical signal;
   a receiving end comprising an optical detector and a first optical adjustment module; and
   a controller, wherein
   the optical detector is configured to receive an optical signal from the first optical adjustment module;
   the controller is configured to:
      acquire the optical signal received by the optical detector;
      obtain, based on the optical signal received by the optical detector, an optical power of the optical signal received by the optical detector; and
      generate a control command based on the optical power and transmit the control command, and the first optical adjustment module is configured to:
  receive the control command and the optical signal emitted by the laser;
  adjust, in response to the control command, the optical signal emitted by the laser to cause the optical power of the optical signal received by the optical detector to be in a preset reasonable range; and
  transmit the adjusted optical signal to the optical detector, wherein
the controller being configured to generate a control command based on the optical power and transmit the control command comprises the controller being configured to:
  generate a first control command and transmit the first control command in a case that the optical power is not in the preset reasonable range; and
  generate a second control command and transmit the second control command in a case that the optical power is in the preset reasonable range, wherein
the first optical adjustment module is configured to:
  in response to the first control command received by the first optical adjustment module, adjust the optical signal emitted by the laser which is received by the first optical adjustment module to cause the optical power of the optical signal received by the optical detector to be in the preset reasonable range, and transmit the adjusted optical signal to the optical detector; and
  in response to the second control command received by the first optical adjustment module, transmit an optical signal received by the first optical adjustment module to the optical detector,
wherein the first optical adjustment module comprises:
a first optical amplifier configured to:
  in a case that the optical power is less than a lower limit of the preset reasonable range, in response to the first control command received by the first optical amplifier, amplify the optical signal emitted by the laser which is received by the first optical amplifier to cause an optical power of the amplified optical signal to be in the preset reasonable range, and transmit the amplified optical signal to the optical detector; and
  in response to the second control command received by the first optical amplifier, transmit an optical signal received by the first optical amplifier to the optical detector, and
a first optical attenuator configured to:
  in a case that the optical power is greater than an upper limit of the preset reasonable range, in response to the first control command received by the first optical attenuator, attenuate the optical signal emitted by the laser which is received by the first optical attenuator to cause an optical power of the attenuated optical signal to be in the preset reasonable range, and transmit the attenuated optical signal to the optical detector; and
  in response to the second control command received by the first optical attenuator, transmit an optical signal received by the first optical attenuator to the optical detector,
wherein the emitting end further comprises a second optical adjustment module, wherein
the controller is further configured to:
  generate a third control command and transmit the third control command, in a case that the optical power of the optical signal received by the optical detector is not in the preset reasonable range;
  generate a fourth control command and transmit the fourth control command, in a case that the optical power of the optical signal received by the optical detector is in the preset reasonable range;
the second optical adjustment module is configured to:
  in response to the third control command received by the second optical adjustment module, adjust the optical signal emitted by the laser which is received by the second optical adjustment module to cause the optical power of the optical signal received by the optical detector to be in the preset reasonable range, and transmit the adjusted optical signal to the first optical adjustment module; and
  in response to the fourth control command received by the second optical adjustment module, transmit an optical signal received by the second optical adjustment module to the first optical adjustment module,
wherein the second optical adjustment module comprises:
a second optical amplifier configured to:
  in a case that the optical power is less than the lower limit of the preset reasonable range, in response to the third control command received by the second optical amplifier, amplify the optical signal emitted by the laser which is received by the second optical amplifier to cause the optical power of the optical signal received by the optical detector to be in the preset reasonable range, and transmit the amplified optical signal to the first optical adjustment module; and
  in response to the fourth control command received by the second optical amplifier, transmit an optical signal received by the second optical amplifier to the first optical adjustment module, and
a second optical attenuator configured to:
  in a case that the optical power is greater than the upper limit of the preset reasonable range, in response to the third control command received by the second optical attenuator, attenuate the optical signal emitted by the laser which is received by the second optical attenuator to cause the optical power of the optical signal received by the optical detector to be in the preset reasonable range, and transmit the attenuated optical signal to the first optical adjustment module; and
  in response to the fourth control command received by the second optical attenuator, transmit an optical signal received by the second optical attenuator to the first optical adjustment module,
wherein the emitting end further comprises a collimator, wherein
the controller is further configured to:
  generate a fifth control command and transmit the fifth control command, in a case that the optical power is not in the preset reasonable range; and
  generate a sixth control command and transmit the sixth control command, in a case that the optical power is in the preset reasonable range, and
the collimator is configured to:
  receive the fifth control command and adjust a focus of the collimator in response to the fifth control command to adjust a divergence angle of an optical signal transmitted by the second optical adjustment module to cause the optical power to be in the preset reasonable range, and transmit the adjusted optical signal to the first optical adjustment module; and transmit, in response to the sixth control command received by the collimator, an optical signal received by the collimator to the first optical adjustment module.

2. The FSO communication system according to claim 1, wherein the receiving end further comprises a wavefront sensor, wherein a first input terminal of the wavefront sensor is connected to an output terminal of the first optical amplifier, a second input terminal of the wavefront sensor is connected to an output terminal of the first optical attenuator, and an output terminal of the wavefront sensor is connected to an input terminal of the optical detector, and the wavefront sensor is configured to reshape an optical signal received by the wavefront sensor and transmit the reshaped optical signal to the optical detector.

3. The FSO communication system according to claim 2, wherein the receiving end further comprises an acquiring module and an adjusting module, wherein the acquiring module is configured to acquire an environmental parameter and transmit the environmental parameter to the controller;

the controller is further configured to receive the environmental parameter, generate a seventh control command based on the environmental parameter, and transmit the seventh control command; and the adjusting module is configured to receive the seventh control command, and adjust a relative altitude and a relative pitch angle between the receiving end and the emitting end based on the seventh control command.

4. The FSO communication system according to claim 3, wherein the environmental parameter comprises one or more of temperature, humidity and sunlight.

5. The FSO communication system according to claim 1, wherein the first optical amplifier is an erbium-doped fiber amplifier or a semiconductor amplifier.

6. The FSO communication system according to claim 1, wherein the second optical amplifier is an erbium-doped fiber amplifier or a semiconductor amplifier.

7. The FSO communication system according to claim 1, wherein the first optical attenuator is a thin-film optical attenuator.

8. The FSO communication system according to claim 1, wherein the second optical attenuator is a thin-film optical attenuator.

* * * * *